United States Patent [19]
Cosner et al.

[11] Patent Number: 5,563,794
[45] Date of Patent: Oct. 8, 1996

[54] REPETITIVE CONTROL OF THERMAL SHOCK DISTURBANCE

[75] Inventors: Christopher M. Cosner, Manhattan Beach; Stuart F. Bockman, Torrance, both of Calif.

[73] Assignee: Hughes Aircraft Company, Los Angeles, Calif.

[21] Appl. No.: 156,341

[22] Filed: Nov. 22, 1993

[51] Int. Cl.$^6$ .................................................. B64G 1/24
[52] U.S. Cl. .......................... 364/434; 364/148; 244/164
[58] Field of Search .................................. 364/459, 432, 364/434, 559, 571.03, 148, 152, 179, 176, 177, 455; 244/164, 165, 171, 173

[56] References Cited

U.S. PATENT DOCUMENTS

| | | | |
|---|---|---|---|
| 4,567,564 | 1/1986 | Bittner et al. | 364/434 |
| 5,119,287 | 6/1992 | Nakamura et al. | 364/148 |
| 5,211,360 | 5/1993 | Zimbelman | 244/164 |
| 5,220,265 | 6/1993 | Araki et al. | 318/610 |
| 5,337,981 | 8/1994 | Bender | 244/164 |

OTHER PUBLICATIONS

Sorano, B. C. and J. H. Green, "Dynamic Modeling of Thermal Shock", IEEE Regional Conference on Aerospace Controls Systems, Thousand Oaks, California 25–27 May 1993.

Dennehy, C., D. Zimbelman, and R. Welch, "Sunrise/Sunset Thermal Shock Disturbance Analysis and Simulation for the TOPEX Satellite", AIAA 90–0470, 28th Aerospace Sciences Meeting, Reno, Neveda 8–11 Jan. 1990.

Zimberman, D., R. Welch and G. Born, "Optimal Temperature Estimation for Modeling the Thermal Elastic Shock Disturbance Torque", AIAA Journal of Spacecraft vol. 28, No. 4., 1991, pp. 448–456.

Zimbelman, D., "Thermal Elastic Shock and Its Effect on TOPEX Spacecraft Attitude Control," American Astronomical Society, Washington DC, Paper 91–056, Feb. 1991.

Zimbelman, D., C. Dennehy, R. Welch, and G. Born. "A Technique for Optimal Temperature Estimation for Modeling Sunrise/Sunset Thermal Snap Disturbance Torque", NASA GSFC, Flight Mechanics/Estimation Theory Symposium, 1990 pp. 431–446.

(List continued on next page.)

*Primary Examiner*—Michael Zanelli
*Attorney, Agent, or Firm*—Elizabeth E. Leitereg; Terje Gudmestad; Wanda K. Denson-Low

[57] ABSTRACT

A control system (40) and procedure (50) that uses repetitive control to control repetitive error sources such as result from the phenomenon of thermal shock experienced by a spacecraft (10). Repetitive control is a "learning algorithm" that substantially eliminates errors in a stable control system (43) that performs highly repeatable tasks. The repetitive control system (40) and procedure (50) employs a repetitive signal generator (41) ($G_r$), to store a sensed short-term error signal during each cycle and to process it to generate a signal that compensates for the error. The repetitive control system and procedure integrates (52) the error signal over several cycles, multiplies (53) the integrated value by a predetermined gain factor, and sums (54) it with the sensed error signal before the sensed error reaches the stable controller (43). An output filter (42), $G_f$, which may be a multirate-sampling output filter, may be used to increase stability robustness of the repetitive control system (40) and procedure (50). The present repetitive control system (40) and procedure (50) substantially eliminates pointing error caused by thermal shock disturbance, for example. The repetitive control system (40) and procedure (50) "learns" the errors that exist in the system and over several cycles, converges on a substantially exact compensation for these errors. Implementation of the present control system (40) and procedure (50) allows the spacecraft (10) to maintain precise pointing throughout an eclipse and thereby allow the spacecraft (10) to perform its mission despite the presence of thermal shock disturbances or errors caused by other repetitive error sources.

14 Claims, 2 Drawing Sheets

OTHER PUBLICATIONS

Bainum, P., N. Hamsath and R. Krishna, "The Dynamics and Control of Large Space Structure after the Onset of Thermal Shock", Acta Astronautica, vol. 19, No. 1, 1989 pp. 1–8.

Hamsath, N., P. Bainum, and R. Krishna, "The Development of an Environmental Disturbance Torque Model for Large Space Structures after the Onset of Thermal Shock", AIAA paper 86–2123.

"Solar Array Flight Experiment/Dynamic Augmentation Experiment", Lockheed Missles and Space/Marshall Space Flight Center, Ca. 1985.

Treble, F., "Solar Arrays for the Next Generation of Communication Satellites", British Interplanitary Society Journal, vol. 26, Aug. 1973, pp. 449–465.

Sudey, J. and J. Schulman "In Orbit Measurements of LANDSAT–D Thematic Mapper Dynamic Disturbances", Acta Astronautica, vol. 12, No. 7/8, 1985, pp. 485–503.

Inoue, T., M. Nakano and S. Iwai, "High Accuracy Control of a Proton Synchroton Magnet Power Supply", Proceedings of 8th World Congress of IFAC, vol. XX, pp. 216–221, 1981.

Tomizuka, M., T. Tsao and K. Chew, "Discrete–Time Domain Analysis and Synthesis of Repetitive Controllers", American Controls Conference, Atlanta, 1988.

Tsai, M., G. Anwar and M. Tomizuka, "Discrete Time Repetitive Control for Robot Manipulators", Proceedings of 1988 IEEE International Conference on Robotics and Automation, Philadelphia, 1988.

Tsao, T., and M. Tomizuka, "Adaptive and Repetitive Control Algorithms for Noncircular Machining", Proceedings of the 1988 American Control Conference, 1988.

Cosner, C., G. Anwar and M. Tomizuka, "Plug in Repetitive Control for Industrial Robotic Manipulators", Proceedings of 1990 IEEE Conference on Robotics and Automation, Cleveland, 1990.

Lambertson, M., Rohrbaugh, D., and Garrick, J., "Solar Array Thermal Snap and the Characteristics of Its Effect on UARS", NASA–GSFC, Flight Mechanics/Estimation Theory Symposium, 1992, pp. 578–588.

Freeman; Spacecraft On–Orbit Deployment Anomalies: What can be done?; Apr. 1993; IEEE AES Systems Magazine; pp. 3–15.

REPETITIVE CONTROL OF THERMAL SHOCK DISTURBANCE

BACKGROUND

The present invention relates to spacecraft control systems, and more particularly, to spacecraft control systems that provide for control of thermal shock disturbance and errors caused by other repetitive error sources.

Thermal shock disturbance is an industry-wide problem experienced by low earth orbit spacecraft. When a spacecraft enters an eclipse, abrupt temperature changes cause its solar panels to deform. This causes an exchange in momentum between the body of the spacecraft and the panels which results in short-term pointing errors. The severity of the pointing error depends upon the size of the solar wing and other factors.

Conventional solutions to thermal shock disturbance fall into two general categories. The first relates to the mechanical design of the solar panel. By reducing the bending of the solar panel or the momentum it imparts to the spacecraft, optimizing the mechanical design can help alleviate the problem. Clever mounting of the panel can also significantly reduce the momentum imparted to the spacecraft. These solutions have been explored and they tend to increase the cost of the spacecraft significantly. The second solution relates to the design of the control system. A high bandwidth control system may alleviate the pointing disturbance, but avoiding the flex modes of the structure or the transmission of sensor or actuator noise is difficult. Reducing sensor or actuator noise or altering the flex modes of the structure also tend to be high cost solutions.

Feedforward schemes are a reasonable solution but they are limited by the ability of designers to model and construct the signal that needs to be fed forward. Conventional feedforward schemes for controlling thermal shock disturbance are subject to certain limitations: their ability to estimate the disturbance; and the capability to construct a signal that exactly compensates this disturbance. Repetitive control improves upon these methods by taking advantage of the repeatability of the disturbance and using the information inherent in the error signal over previous cycles.

Regarding control of thermal shock disturbance, prior art solutions concentrate on modeling the thermal shock phenomenon and designing solar panels to minimize the transfer of momentum or constructing feedforward schemes. For example, a two-pulse feedforward scheme based on ground based estimates is planned for use on the HS601-C (Galaxy) spacecraft developed by the assignee of the present invention. This scheme is disclosed in U.S. patent application Ser. No. 08/053,056, filed Apr. 26, 1993, entitled "Spacecraft Disturbance Compensation Using Feedforward Control", and is assigned to the assignee of the present invention.

In addition, a number of papers have been written that address thermal shock. These papers include: Sorano, B. C. and J. H. Green, "Dynamic Modelling of Thermal Shock", IEEE Regional conference on Aerospace Control Systems, Thousand Oaks, Calif. 25–27 May 1993; Dennehy, C., D. Zimbelman, and R. Welch, "Sunrise/Sunset Thermal Shock Disturbance Analysis and Simulation for the Topex Satellite", AIAA 90-0470, 281th Aerospace Sciences Meeting, Reno, Nev. 8–11 January 1990; Zimbelman, D, R. Welch and G. Born, "Optimal Temperature Estimation for Modeling the Thermal Elastic Shock Disturbance Torque", AIAA Journal of Spacecraft Vol 28. No 4, 1991, pp 448–456; Zimbelman, D., "Thermal Elastic Shock and. Its Effect on TOPEX Spacecraft Attitude Control," American Astronomical Society, Washington, D.C. Paper 91-056, Feb. 1991; Zimbelman, D., C. Dennehy, R. Welch, and G. Born. "A Technique for Optimal Temperature Estimation for Modeling Sunrise/Sunset Thermal Snap Disturbance Torque", NASA GSFC, Flight Mechanics/Estimation Theory Symposium, 1990 pp. 431–446; Jasper, P. and S. Neste, "UARS Solar Array Snap", General Electric Space Division, U-1K21-UARS-481, Philadelphia, Pa. July 1986; Bainum, P., N. Hamsath and R. Krishna, "The Dynamics and Control of Large Space Structures after the Onset of Thermal Shock", Acta Astronautica, Vol. 19, No. 1, 1989 pp 1–8; Hamsath, N., P. Bainum, and R. Krishna, "The Development of an Environmental Disturbance Torque Model for Large Space Structures after the Onset of Thermal Shock", AIAA paper 86-2123; "Solar Array Flight Experiment/Dynamic Augmentation Experiment", Lockheed Missiles and Space/Marshall Space Flight Center, Ca. 1985; Treble, F, "Solar Arrays for the Next Generation of Communication Satellites", British Interplanetary Society Journal, Vol. 26, Aug. 1973, pp 449–465; and Sudey, J and J. Schulman, "In Orbit Measurements of LANDSAT-D Thematic Mapper Dynamic Disturbances", Acta Astronautica, Vol. 12, No. 7/8,1985, pp. 485–503.

Regarding repetitive control schemes, prior art solutions have primarily concentrated on its application to robotics, although repetitive control has been used on other applications such as disk drives and a synchrotron. A number of papers have been written that address repetitive control. These papers include: Inoue, T., M. Nakano and S. Iwai, "High accuracy control of a proton synchroton magnet power supply", Proceedings of 8th World Congress of IFAC, Vol. XX, pp. 216–221.1981; Tomizuka, M., T. Tsao and K. Chew, "Discrete-time domain analysis and synthesis of repetitive controllers", American Controls Conference, Atlanta, 1988; Tsai, M, G. Anwar and M. Tomizuka, "Discrete time repetitive control for robot manipulators", Proceedings of 1988 IEEE International Conference on Robotics and Automation, Philadelphia, 1988; Tsao, T., and M. Tomizuka, "Adaptive and repetitive control algorithms for noncircular machining", Proceedings of the 1988 American Control Conference, 1988; Cosner, C., G. Anwar and M. Tomizuka, "Plug in repetitive control for industrial robotic manipulators", Proceedings of 1990 IEEE Conference on Robotics and Automation, Cleveland, 1990.

Consequently, it is an objective of the present invention to provide for space-craft control systems that provide for control of thermal shock disturbance and errors caused by repetitive error sources.

SUMMARY OF THE INVENTION

The present invention is a control system and processing algorithm or procedure that uses repetitive control concepts to control the phenomenon of thermal shock disturbance. Repetitive control is a "learning algorithm" that substantially eliminates the errors in a stable control system that performs highly repeatable tasks.

The repetitive control system and procedure employs a repetitive signal generator ($G_r$) to store a short-term pointing error during each cycle. The repetitive control system and procedure integrates the short-term pointing error signal over several cycles, multiplies the integrated value by a predetermined gain factor, and sums it with the short-term pointing error in a summing device to produce a compensated pointing error signal which reaches the stable controller. An output filter $G_f$ which may be a multirate-sampling output filter, may be used to increase stability robustness of the repetitive control system and procedure.

The repetitive control system and procedure of the present invention thus learns the errors that exist in the system and over several cycles, and provides compensation for these errors. Implementation of the present control scheme allows the spacecraft to maintain precise pointing throughout the eclipse and thereby allow the spacecraft to perform its mission despite the presence of thermal shock. The rejection of the thermal shock disturbance by the present control system is a significant improvement over the performance of existing thermal shock control systems.

For some spacecraft, thermal shock disturbance in a fixed low equatorial orbit is a highly repetitive phenomenon. This is an ideal application for the repetitive control system and procedure, which nearly eliminate pointing disturbance errors caused by this phenomenon. The application of repetitive control to the control of thermal shock disturbance is a novel aspect of the present invention.

One advantage of the repetitive control system and procedure of the present invention is that it automatically learns the required signal that is necessary to achieve proper control, constructs it, and applies it in such a way that the existing stable control system is left unaltered.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
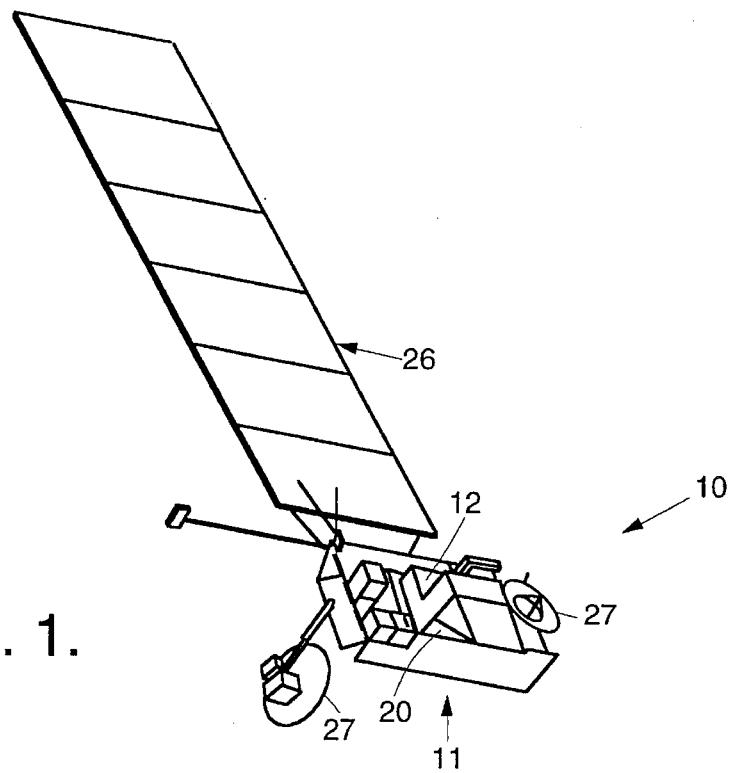
FIG. 1 shows a typical low-earth-orbit spacecraft on which a repetitive control system and procedure of the present invention may be employed.
Figure 2:
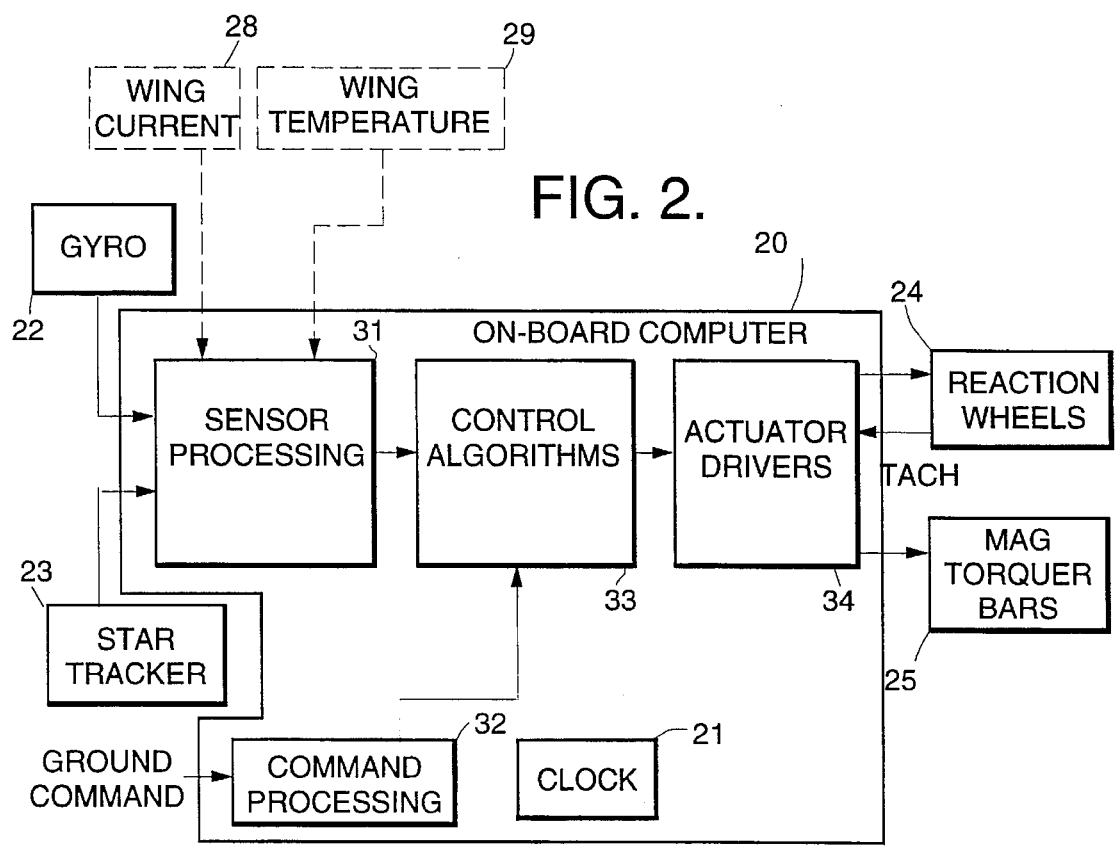
FIG. 2 shows a block diagram of a spacecraft control system employed on the low-earth-orbit spacecraft of FIG. 1 and in which the repetitive control system and procedure in accordance with the principles of the present invention may be employed.

Referring to the drawing figures, FIG. 1 shows a typical low-earth-orbit spacecraft 10 on which a repetitive control system and procedure in accordance with the principles of the present invention may be employed. A block diagram of the spacecraft attitude control system 11 that employs the repetitive control system and procedure in accordance with the principles of the present invention is shown in FIG. 2. Specific details of the repetitive control system and procedure are provided below with reference to FIG. 3. Referring to FIGS. 1 and 2, the spacecraft 10 comprises the following components that comprise a spacecraft attitude control system 11 that are used for attitude control during normal on-orbit operation.

A single, relatively large solar wing 26 (solar panel 26) shown in FIG. 1 provides power to the spacecraft attitude control system 11 and other electronic components disposed on the spacecraft 10. The use of the single wing 26 is typically necessitated by clear field of view requirements of remote sensing science instruments 12 and antennas 27 disposed on the spacecraft 10. The spacecraft attitude control system 11 comprises a computer 20 that performs attitude control functions for the spacecraft 10. An accurate clock oscillator 21 provides clock functions as part of the computer 20. A plurality of gyros 22 and star trackers 23 are coupled to the computer 20 to provide three-axis attitude sensing. A plurality of reaction wheels 24 are coupled to the computer 20 that provide primary actuators for changing the attitude of the spacecraft 10. A plurality of magnetic torquer bars 25 are coupled to the computer 20 and are used to remove (dump) momentum buildup. Optional inputs to the computer 20 are provided by a wing current sensor 28 and a wing temperature sensor 29, illustrated in dashed boxes in FIG. 2.

The computer 20 is comprised of sensor processing circuitry 31 or algorithms 31, and command processing circuitry 32 or algorithms 32. The sensor processing circuitry 31 is adapted to receive signals from the gyros 22, the star trackers 23, and the wing current and temperature sensors 28, 29. The sensors 28, 29 are generally provided to support ground monitoring of spacecraft functions and health. The command processing circuitry 32 is adapted to receive ground command signals from an earth station, for example. A plurality of control algorithms 33 are implemented in software or circuitry and are coupled to the sensor and command processing circuitry 31, 32. Control algorithms 33 process short-term pointing error signifies to generate a compensated pointing error signal that accurately compensates for the pointing error of the spacecraft 10. Outputs of the control algorithms 33 and the command processing 32 are coupled to actuator drivers 34 that are in turn coupled to the reaction wheels 24 and magnetic torque bars 25. The reaction wheels provide a tachometer signal to the actuator drivers.

The block diagram of FIG. 2 illustrates functions of the primary components of the spacecraft attitude control system 11. All of these components are part of the spacecraft 10 regardless of the addition of the present repetitive control system and procedure that controls thermal shock. The repetitive control aspects provided by the present invention may be implemented as an additional control algorithm that is coupled to a stable attitude controller resident in the computer 20. The repetitive control system and procedure is implemented in the block identified as control algorithms 33 in FIG. 2 and will be discussed in more detail below with regard to FIG. 3.

Figure 3:
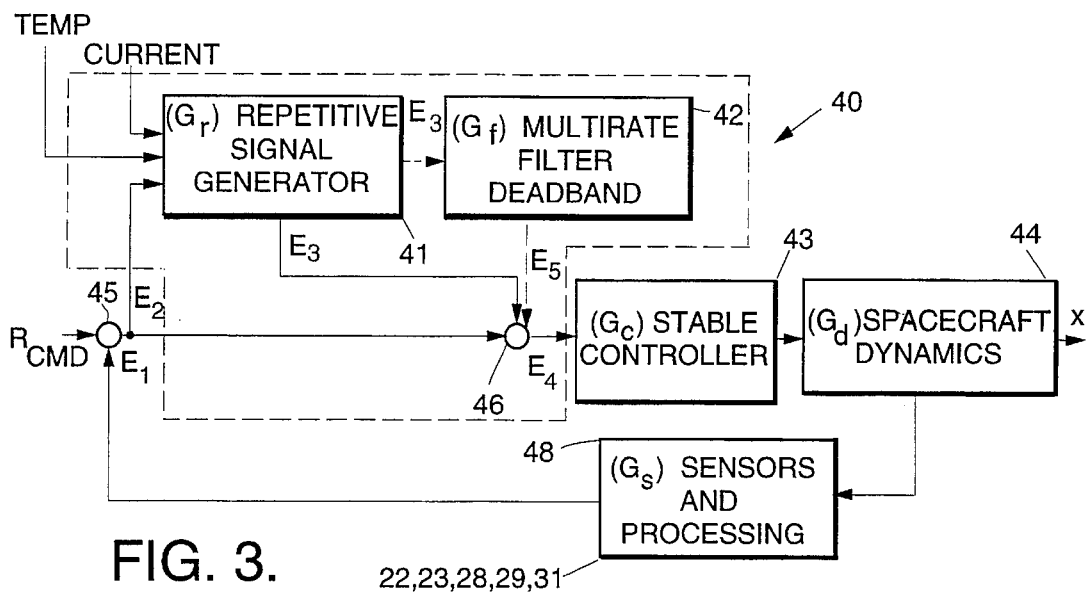
FIG. 3 illustrates the repetitive control system and procedure in accordance with the present invention implemented in the spacecraft control system of FIG. 2.

Referring to FIG. 3, it illustrates a repetitive control system 40 in accordance with the principles of the present invention implemented in the control system 11 of FIG 1. FIG. 3 illustrates the manner in which the repetitive control system 40 is coupled to the spacecraft attitude control system 11, and in particular illustrates the details of the control algorithms 33 and how the present invention is integrated therewith. A feedback signal is derived from the output of the spacecraft dynamics 44 using the sensors 22, 23, which is processed by the sensor processing circuit 31, depicted generally by processing block 48 ($G_s$). A sensed pointing error signal $E_1$ output of the processing circuit 31 (or $G_s$ 48) is summed with a pointing command signal ($R_{CMD}$) in a first summing device 45 which produces a short-term pointing error signal $E_2$ as its output.

With regard to the present invention, repetitive control system 40 is comprised of a repetitive signal generator 41 ($G_r$), which stores error signal $E_2$ during each cycle. The repetitive control system 40 integrates error signal $E_2$ over several cycles, multiplies the integrated value by a predetermined gain factor to generate an integrated and multiplied pointing error signal $E_3$. Error signal $E_3$ is summed with error signal $E_2$ in a summing device 46 to produce a compensated pointing error signal $E_4$ which reaches the stable controller ($G_c$) 43 which couples its output to the spacecraft dynamics 44 ($G_d$) of the spacecraft 10. An optional output filter 42 ($G_f$) which may be a multirate-sampling output filter, may be used to increase stability robustness of the repetitive control system 40. This will be described in more detail below.

The structure of repetitive control system 40 is such that it may be coupled to the stable controller 43 in the form of a "plug-in" module, for example. Consequently, the repetitive control system 40 may be coupled to the stable controller 43 without alteration thereof. For example, the present repetitive control system 40 may be easily added to controllers disclosed in "Analysis and Synthesis of Discrete-Time Repetitive Controllers" by Tomizuka et al., in Journal of Dynamic Systems, Measurement, and Control, Vol. 111, page 353, September 1989, and "Plug in repetitive control for industrial robotic manipulators" by Cosner et al., in the 1990 Proceedings of the IEEE Conference on Robotics and Automation, Cleveland, 1990.

In operation, the spacecraft 10 is acted upon by a periodic thermal shock disturbance. The gyros are used to sense the rates of roll, pitch, and yaw of the spacecraft 10 which are integrated by sensor processing algorithms in the processing circuit 31 to produce a sensed spacecraft attitude. This sensed attitude is periodically updated by readings from the star trackers 23. The spacecraft attitude control system 11 generates torque commands for the reaction wheels 24 based on the sensed attitude. The spacecraft attitude control system 11 has a relatively low bandwidth to avoid coupling of structural modes or sensor or actuator noise. The performance of the spacecraft attitude control system 11 is normally sufficient to provide precision pointing of scientific instruments or the antennas 27.

However, when the spacecraft 10 passes through an eclipse, it undergoes rapid thermal change. As the spacecraft 10 enters the darkness of eclipse, the flexible solar wing 26 cools rapidly. The wing 26 is constructed of several different materials that each contribute to its bending based on its own thermal elastic properties, and the transmission of heat and mechanical stress through the wing 26. As the wing 26 bends, it transfers momentum to the body of the spacecraft 10. This phenomenon happens very rapidly (in a fraction of a minute at low earth orbit) and the bandwidth of the spacecraft attitude control system 11 without the present invention is too low for it to compensate for the changes. This results in a severe short-term pointing error in roll and yaw attitude. Typically, this error is so large that the scientific instruments cannot take useful data.

Several concepts are critical in order to implement the present repetitive control system 40 for thermal shock. Although the present invention appears to be relatively simple, it is memory intensive. Two concepts may be used to reduce the memory requirements of the present repetitive control system 40. First, the time of the occurrence of the thermal shock is deterministic and well-known. The repetitive control system 40 may be turned on only for the portion of the orbit during which thermal shock occurs. This may be implemented using clock, current, or temperature data derived from the sensors 28, 29, for example. Secondly the unique nature of repetitive control provides the error signal for the previous cycle that is used to construct the output of the repetitive control system 40, not just at the current time but in the future. This allows the use of the multirate-sampling output filter 42 that uses look-ahead for interpolation. Alternatively, the memory requirements and processing may be off-loaded to and performed by a computer located at a ground station if the above measures are insufficient.

One robustness filter that is suggested in the Tomizuka et al. article cited in this detailed description is based on the assumption of the availability of a precise model of the system. If this model is imprecise, the filter tends to decrease robustness rather than increase it. Rather than use this type of filter, an optimized embodiment of the present invention employs "deadbands" to provide stability. The deadbands stop the present system 40 and procedure from integrating if the magnitude of the error is below the given deadband. The integration resumes once the error exceeds the deadband.

Figure 4:
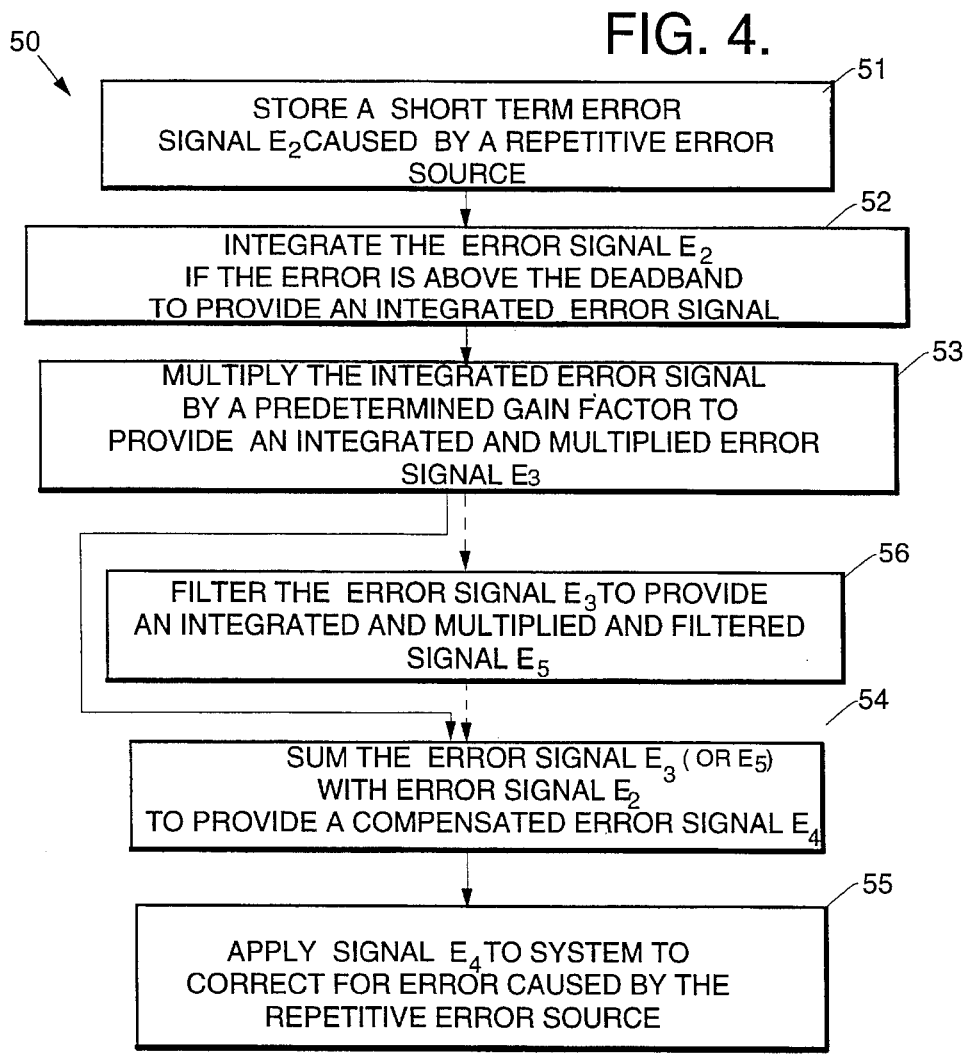
FIG. 4 is a flow diagram illustrating the repetitive control procedure of the present invention.

For the purpose of completeness, FIG. 4 is a flow diagram illustrating a repetitive control procedure 50 in accordance with the principles of the present invention. The present repetitive control procedure 50 is adapted to process error signals derived from a repetitive error source. The repetitive control procedure 50 is comprised of the following steps. The first step comprises storing 51 a short-term error signal $E_2$ during each repeat cycle that is indicative of the sensed short-term error from the repetitive error source, such as a thermal shock disturbance, for example. The second step comprises integrating 52 error signal $E_2$ over a predetermined number of cycles to provide an integrated error signal. The third step comprises multiplying 53 the integrated error signal by a predetermined gain factor to provide an integrated and multiplied error signal $E_3$. The fourth step comprises summing 54 the error signal $E_3$ with the error signal $E_2$ to provide a compensated error signal $E_4$ that is adapted to compensate for the sensed error due to the repetitive error source. The fifth step is to apply error signals $E_{E4}$ to the stable controller 43, for example, or to other desired control circuitry.

An optional sixth step comprises filtering 56 error signal $E_3$ to increase stability of the repetitive control procedure prior to summing the error signal $E_3$ with the error signal $E_2$. The step of filtering 56 the error signal $E_3$ may comprise the step of sampling the error signal $E_2$ using deadband filtering, which is achieved by integrating error signal $E_2$ when the magnitude of the error is above a deadband not integrating when the magnitude of the error is below the deadband, and resuming integration once again if the magnitude of the error goes above the deadband.

The equations that are goes implemented in the repetitive control system and procedure are as follows.

$$G_r(z) = \frac{K_r z^{-N_1}}{1 - z^{-N}}$$

where $G_r(z)$ is the transfer function of repetitive signal generator, z is the operator of a one-sided z transform of the discrete time domain, N is the number of sample periods in a repetitive cycle and $N_1$ is the delay, and $$G_f(z) = (z^1 - 1)\frac{T_S - T_D}{T_D} + 1$$

where $T_D$ is the input (slower) sampling period and $T_S$ is the current output (faster) sampling period.

Other applications of the repetitive control system 40 and procedure 50 of the present invention in the field of spacecraft attitude control are possible as well. Generally, any highly repetitive error source may be processed by the present repetitive control procedure in order to provide for improved control. An example application is the use of the present repetitive control procedure to control the disturbance caused by aero-drag torque on the spacecraft 10 when the solar wing has an angle of attack of about zero, which typically occurs twice per orbit if the array tracks the sun.

Thus there has been described a new and improved spacecraft control system that provides for repetitive control of thermal shock disturbance and errors caused by other repetitive error sources. It is to be understood that the above-described embodiment is merely illustrative of some of the many specific embodiments which represent applications of the principles of the present invention. Clearly, numerous and other arrangements can be readily devised by those skilled in the an without departing from the scope of the invention.

What is claimed is:

1. A repetitive control system for use within an attitude control system of a spacecraft that experiences a pointing error due to thermal shock disturbance, wherein the attitude control system comprises a computer that performs attitude control functions for the spacecraft, wherein the computer comprises a stable controller ($G_c$) that communicates with spacecraft attitude control dynamics, wherein the repetitive control system comprises:

a repetitive signal generator ($G_r$) for storing a short-term pointing error signal during each thermal shock disturbance cycle that is indicative of the pointing error of the spacecraft, for integrating the short-term pointing error signal over several cycles to provide an integrated pointing error signal, and for multiplying the integrated pointing error signal by a predetermined gain factor to provide an integrated and multiplied pointing error signal; and a summing device for summing the integrated and multiplied pointing error signal with the short-term pointing error signal and for providing the stable controller ($G_c$) with a compensated pointing error signal which compensates for spacecraft pointing error.

2. The repetitive control system of claim 1 which further comprises an output filter ($G_f$) coupled to the repetitive signal generator for increasing stability of the repetitive control system.

3. The repetitive control system of claim 2 wherein the output filter comprises a multirate-sampling output filter.

4. A repetitive control procedure for use within an attitude control system of a spacecraft that experiences a pointing error due to thermal shock disturbance, wherein the attitude control system comprises a computer that performs attitude control functions for the spacecraft, wherein the computer comprises a stable controller ($G_c$) that communicates with spacecraft attitude control dynamics, the repetitive control procedure comprising the steps of:

storing a short-term pointing error signal during each thermal shock disturbance cycle that is indicative of the pointing error of the spacecraft;

integrating the short-term pointing error signal over a predetermined number of cycles to provide an integrated pointing error signal;

multiplying the integrated pointing error signal by a predetermined gain factor to provide an integrated and multiplied pointing error signal;

summing the integrated and multiplied pointing error signal with the short-term pointing error signal to provide a compensated pointing error signal; and applying the compensated pointing error signal to the stable controller ($G_c$) to compensate for the pointing error of the spacecraft due to the thermal shock disturbance.

5. The repetitive control procedure of claim 4 which further comprises the step of filtering the integrated and multiplied pointing error signal to increase stability of the repetitive control procedure.

6. The repetitive control procedure of claim 5 wherein the step of filtering the integrated and multiplied pointing error signal comprises the step of sampling the integrated and multiplied pointing error signal using deadband filtering.

7. The repetitive control procedure of claim 5 wherein the step of filtering the integrated and multiplied pointing error signal comprises the steps of:

integrating the short-term pointing error signal when the magnitude of the error is above a given deadband;

not integrating the short-term pointing error signal when the magnitude of the error is below the deadband; and resuming integration once again if the magnitude of the error goes above the deadband.

8. A repetitive control procedure for use within an attitude control system of a spacecraft that experiences a repetitive error due to a repetitive error source, wherein the attitude control system comprises a computer that performs attitude control functions for the spacecraft, wherein the computer comprises a stable controller ($G_c$) that communicates with spacecraft attitude control dynamics, the repetitive control procedure comprising the steps of:

storing a short-term error signal during each repeat cycle that is indicative of the error from the repetitive error source;

integrating the short-term error signal over a predetermined number of cycles to provide an integrated error signal;

multiplying the integrated error signal by a predetermined gain factor to provide an integrated and multiplied error signal;

summing the integrated and multiplied error signal with the short-term error signal to provide a compensated error signal; and applying the compensated error signal to the stable controller ($G_c$) to compensate for the repetitive error of the spacecraft due to the repetitive error source.

9. The repetitive control procedure of claim 8 which further comprises the step of filtering the integrated and multiplied error signal to increase stability of the repetitive control procedure.

10. The repetitive control procedure of claim 9 wherein the step of filtering the integrated and multiplied error signal comprises the step of sampling the integrated and multiplied error signal using deadband filtering.

11. The repetitive control procedure of claim 9 wherein the step of filtering the integrated and multiplied error signal comprises the steps of:

integrating the short-term pointing error signal when the magnitude of the error is above a given deadband;

not integrating the short-term pointing error signal when the magnitude of the error is below the deadband; and resuming integration once again if the magnitude of the error goes above the deadband.

12. A repetitive control system for use within an attitude control system of a spacecraft that experiences a pointing error due to cyclic aerodynamic solar wing drag disturbance, wherein the attitude control system comprises a computer that performs attitude control functions for the spacecraft, wherein the computer comprises a stable controller ($G_c$), that communicates with spacecraft attitude control dynamics, wherein the repetitive control system comprises:

means for storing a short-term pointing error signal during each solar wing drag disturbance cycle that is indicative of the pointing error of the spacecraft, for integrating the short-term pointing error signal over several cycles to provide an integrated pointing error signal, and for multiplying the integrated pointing error signal by a predetermined gain factor to provide an integrated and multiplied pointing error signal; and means for summing the integrated and multiplied pointing error signal with the short-term pointing error signal and for providing the stable controller ($G_c$) with a compensated pointing error signal which compensates for spacecraft pointing error.

13. The repetitive control system of claim 12 which further comprises an output filter ($G_f$) coupled to the repetitive signal generator for increasing stability of the repetitive control system.

14. The repetitive control system of claim 13 wherein the output filter comprises a multirate-sampling output filter.

* * * * *